March 4, 1924.
C. C. BLACK
1,485,364
ADJUSTABLE TRACTION CLEAT
Filed Aug. 21, 1922
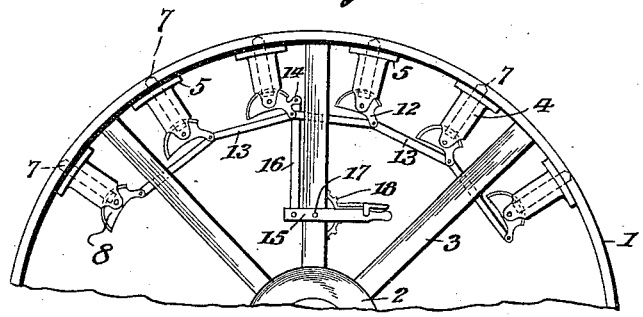
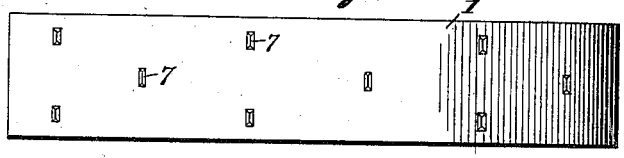
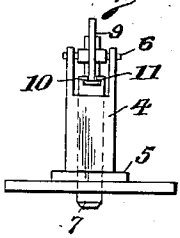
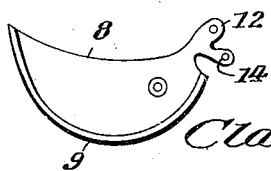
Inventor
Clarence C. Black
By William J. Jacobi
Attorney Patented Mar. 4, 1924.

1,485,364

UNITED STATES PATENT OFFICE.

CLARENCE C. BLACK, OF BROOKVILLE, OHIO.

ADJUSTABLE TRACTION CLEAT.

Application filed August 21, 1922. Serial No. 583,176.

*To all whom it may concern:*

Be it known that CLARENCE C. BLACK, a citizen of the United States, residing at Brookville, in the county of Montgomery and State of Ohio, has invented certain new and useful Improvements in Adjustable Traction Cleats, of which the following is a specification.

This invention relates to an improvement in wheels for traction vehicles, and has for its object to provide a wheel having a normally smooth surface for traveling over the ordinary hard road, but provided with means within the rim of the wheel for projecting spurs outwardly through said rim when the vehicle is running on soft or slippery roads.

Another object of the invention is to provide a wheel for traction vehicles with spurs mounted upon the inside of the wheel, and means adjacent the hub of said wheel and supported by one of the spokes for causing all of said spurs to be simultaneously projected through the rim into position for engaging the ground over which the wheels travel.

A further object of the invention is to provide means adapted to be attached to the interior of any traction wheel and operated by means of a lever for projecting spurs outwardly through the rim of said wheel to engage the ground, increase the traction of the vehicle and prevent slipping of the wheels on smooth, soft or slippery roads.

And a further object of the invention is to provide an attachment for traction wheels of the above stated character which is simple in construction, efficient, durable and one that can be manufactured and applied to an ordinary traction wheel at a relatively low cost.

These and like objects of the invention will be better understood as the description proceeds and as is specifically pointed out in the appended claims.

Referring to the accompanying drawing which forms a part of this specification and which clearly illustrates the operation and construction of the invention, Figure 1 is a fragmentary elevation of a traction wheel, showing my invention applied thereto.

Figure 2 is a plan view of the wheel tread, showing means provided therein for reception of the projecting spurs.

Figure 3 is a detail view of one of the projecting spurs and means for operating same.

Figure 4 is a detail view of one of the traction spurs.

Figure 5 is a side elevation of one of the cams.

Referring to the accompanying drawing in detail, like characters will be used to designate like parts in the different views.

In the drawing, the numeral 1 indicates the rim of a traction wheel made of flat metal with a broad tread, smooth on its outer surface and mounted upon a hub 2 through the medium of spokes 3. These features being common to traction wheels will not be further described in detail as a traction wheel of almost any type may be provided with the novel features of the present invention.

Carried on the inner periphery of the rim 1 and extending around the entire circumference thereof are a plurality of radially disposed bearing brackets 4, each bracket having a base portion 5 thereon which is secured in any preferred manner to said rim. The inner end of each bearing bracket 4 is reduced in width and bifurcated, and journaled in the furcations thereof is a spindle 6. Each bearing bracket 4 is substantially tubular in formation having movably mounted in the bore thereof a traction spur 7 which is also adapted to project through openings formed in the rim 1. Pivotally mounted on each spindle 6 between the furcations of the bearing brackets 4 is a cam 8 having a cam surface 9 beneath which is formed a channel 10 engaging the head 11 formed on the inner end of the projecting spur 7. An arm 12 is formed at the end of each cam 8 and links 13 are utilized to pivotally connect the arms of said cams together, as clearly shown in Figure 1 of the drawing.

As clearly shown in Figures 1 and 5, one of the cams 8 is provided with an additional arm 14 to which is pivotally connected one end of a link 16, the opposite end of the latter having pivotal connection with one end of a lever 15. This lever 15 is fulcrumed, as shown at 17, to one of the spokes 3 of the wheel, said spoke having carried thereon a rack 18, whereby a detent carried on the lever may be engaged therewith and the lever 15 securely held in its adjusted positions.

When the lever 15 is in a position as shown in Fig. 1 of the drawing, the engaging or outer ends of the spurs 17 are drawn to their inoperative positions, thus permitting a broad smooth surface for traveling over hard roads. When the machine reaches soft and slippery portions of the roadway, the lever 15 may be operated to draw the link 16 inwardly which actuates the cam to which it is connected and correspondingly actuates all of the cams simultaneously. This action obviously causes the spurs 7 to project outwardly through the apertures formed in the rim 1, whereby the same may be effective in gripping the roadway and carrying out the purposes for which the same are designed.

In view of the foregoing description of my invention taken in connection with the accompanying drawing, it is thought that any further explanation as to the construction, operation and objects of the invention are unnecessary.

What I claim as new and desire to secure by Letters Patent is:—

1. In a traction wheel, a rim, brackets supported on the inner surface of the rim and each having a central bore therethrough registering with an opening in said rim, traction spurs positioned in said bores of said brackets, a cam pivotally supported in each of said brackets and held in engagement with the projecting spur therein, means for connecting the cams together and means pivotally supported on one of the spokes of the wheel for operating the cams and moving the projecting spurs beyond the surface of the rim simultaneously.

2. In a traction wheel, a rim, brackets supported on the inner surface of said rim and each having a central bore therethrough registering with an opening provided in said rim, traction spurs positioned in said bores of said brackets, a cam pivotally supported in each of said brackets, guide means associated with said spurs and said cams for holding the latter in engagement with said spurs, an arm extending from each of said cams, links connecting said arms together, an additional arm formed on one of said cams, and an operating lever pivotally associated with said last mentioned arm and supported upon one of the spokes of said wheel for operating said cams simultaneously to project the spurs beyond the surface of the rim.

In testimony whereof I affix my signature.

CLARENCE C. BLACK.